United States Patent [19]

Omote

[11] 3,995,751
[45] Dec. 7, 1976

[54] CARGO CONVEYING APPARATUS FOR VESSEL

[76] Inventor: Sadao Omote, c/o Nissei Shipping Co., Ltd., of Sbacks Bldg., No. 18-14, 1-chome, Hamamatsu-cho, Minato, Tokyo, Japan

[22] Filed: June 9, 1975

[21] Appl. No.: 584,889

[30] Foreign Application Priority Data

June 17, 1974 Japan ............................. 49-68967

[52] U.S. Cl. .............................. 214/15 D; 114/72
[51] Int. Cl.$^2$ ...................................... B63B 27/00
[58] Field of Search ............ 114/72, 73; 214/15 D, 214/15 E, 15 R, 14; 198/2, 7 BL, 11, 88, 94, 99; 193/4, 14, 15

[56] References Cited
UNITED STATES PATENTS

| 2,242,206 | 5/1941 | Bisset ................................. 214/14 |
| 3,077,269 | 2/1963 | Jacobs et al. ..................... 214/15 R |

FOREIGN PATENTS OR APPLICATIONS

| 580,192 | 7/1933 | Germany ......................... 214/15 D |
| 621,913 | 6/1961 | Italy .................................... 114/72 |

Primary Examiner—Trygve M. Blix
Assistant Examiner—Jesus D. Sotelo
Attorney, Agent, or Firm—Wenderoth, Lind & Ponack

[57] ABSTRACT

A cargo loading apparatus for a cargo vessel provided on at least one side of the vessel. The apparatus has a first loading part disposed adjacent to one of the longitudinal ends of the vessel and includes a cargo carrying-in conveyor to carry cargo from a quay into an uppermost hold of the vessel, a turning conveyor connected to the upper end of the carrying-in conveyor to turn the cargo in the uppermost hold and a lowering conveyor extending through all of the holds of the vessel to carry the cargo in any of the holds. A second loading part is disposed adjacent to the other longitudinal end of the vessel and includes a carrying-in conveyor to carry cargo on the quay into the uppermost hold and a turning conveyor connected to the upper end of the carrying-in conveyor to turn the cargo to a predetermined area in the uppermost hold.

4 Claims, 10 Drawing Figures

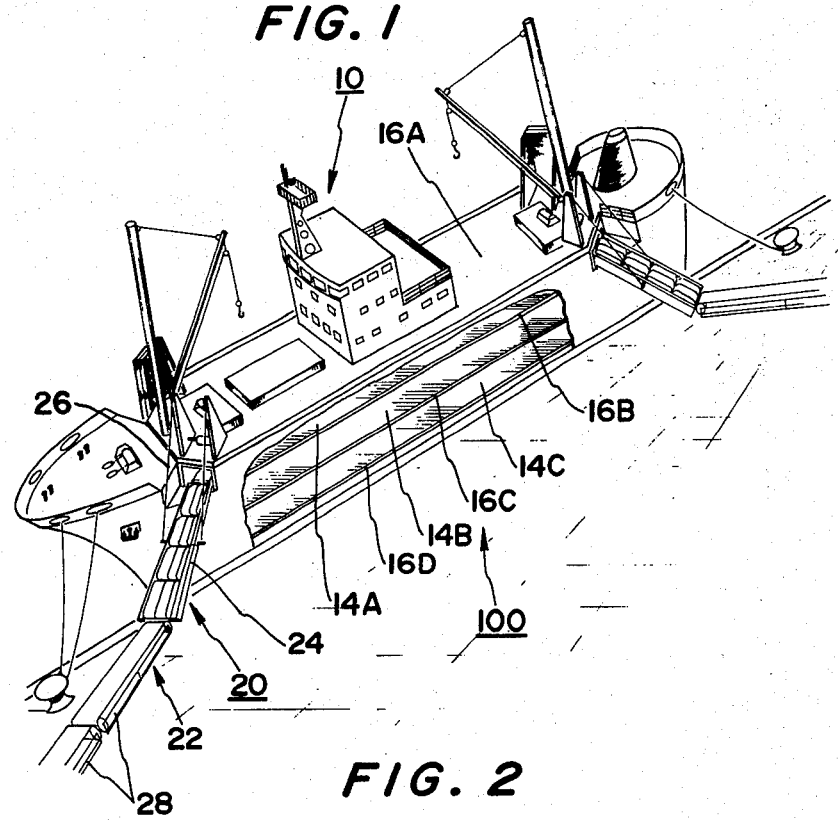
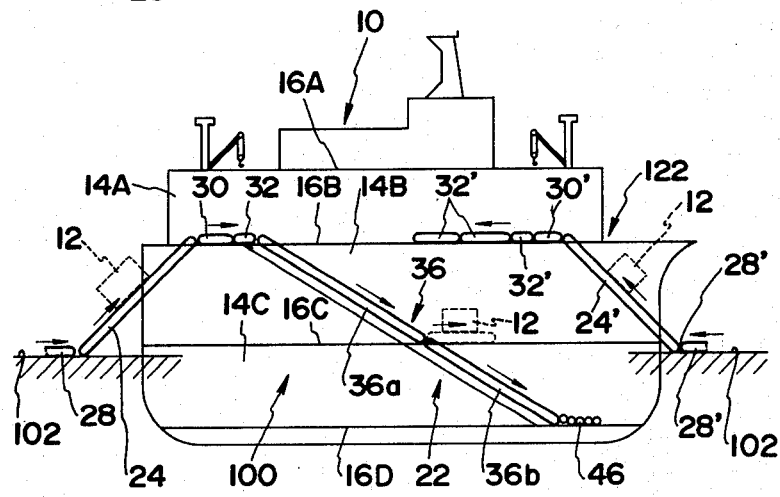

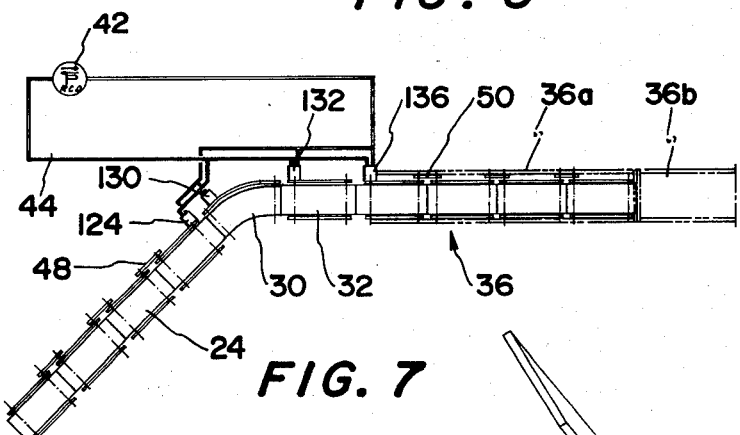
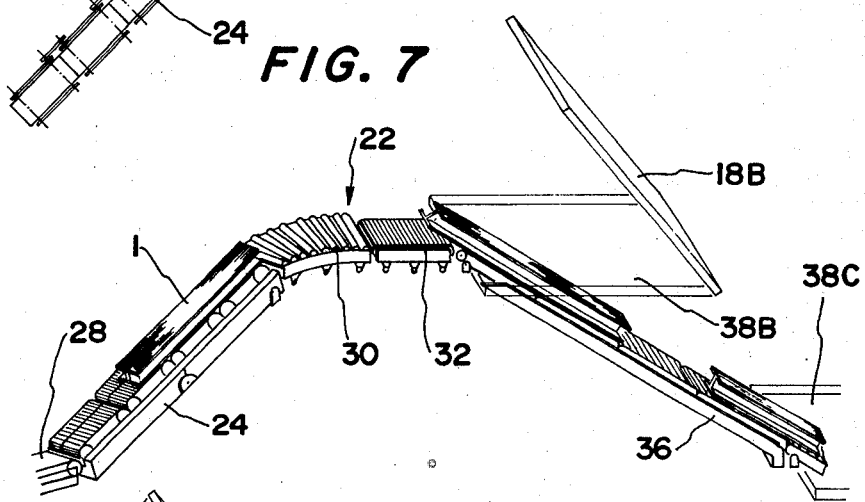
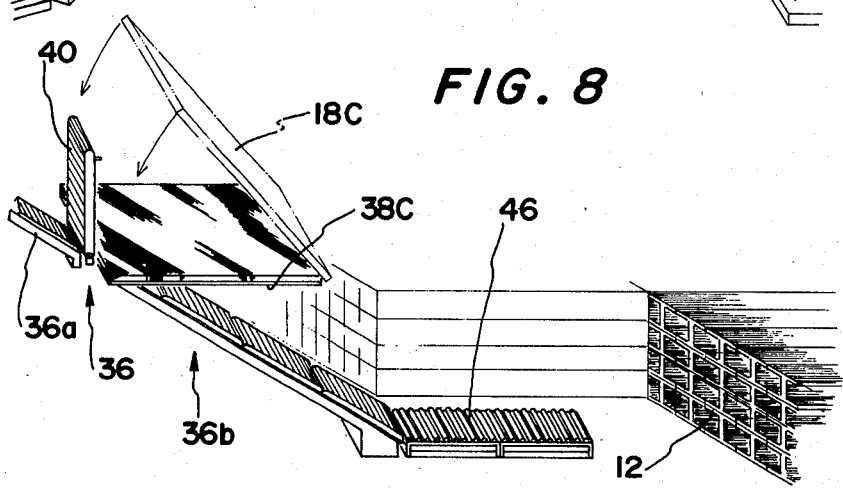

CARGO CONVEYING APPARATUS FOR VESSEL

BACKGROUND OF THE INVENTION

Conventionally, since a cargo vessel is not provided with any means to automatically carry cargo into the vessel, the cargo is carried by operators to a predetermined area in the vessel by ineffectively being raised up by a derrick. Thus, the operation ineffectively consumes much time and labor. Particularly, for a large-sized cargo vessel having a plurality of holds, the cargo has not been carried into the lower holds by utilizing means to automatically carry it into the lower holds of the vessel.

SUMMARY OF THE INVENTION

Accordingly, it is a principal object of the present invention to provide a cargo loading apparatus for a cargo vessel adapted to automatically and effectively carry cargo into the vessel without the consumption of large amounts of time and labor.

It is another object of the present invention to provide a cargo loading apparatus for a vessel adapted to automatically and effectively carry cargo into the vessel even though it is tied up to the quay in any direction thereof.

In accordance with the present invention, there is provided a cargo loading apparatus for a cargo vessel provided on at least one side of the vessel, comprising first loading means disposed adjacent to one of the longitudinal one ends of said vessel and including a carrying-in conveyor disposed between a quay and an uppermost hold in an inclined manner to carry cargo on said quay into said uppermost hold, a turning conveyor connected to the upper end of said carrying-in conveyor to turn said cargo so as to direct it parallel to the axis of said uppermost hold and a lowering conveyor extending through all of the lower holds of said vessel in an inclined manner to carry said cargo into any of said lower holds; and second loading means disposed adjacent to the other longitudinal end of said vessel and including a carrying-in conveyor disposed between said quay and said uppermost hold in an inclined manner to carry cargo on said quay into said uppermost hold and a turning conveyor connected to the upper end of said carrying-in conveyor to turn said cargo to direct it parallel to the axis of said vessel in said uppermost hold.

BRIEF DESCRIPTION OF THE DRAWINGS

The above and other objects and features of the present invention will be apparent from the following description of the preferred embodiment taken with reference to the accompanying drawings in which;

FIG. 1 is a schematic perspective view partly broken away, of a cargo vessel incorparting a preferred embodiment of a cargo loading apparatus of the present invention;

FIG. 2 is a schematic diagram of the cargo loading apparatus of the present invention;

FIG. 6 is a schematic plan view of a drive system for the first loading means of FIG. 3.

FIG. 7 is a view similar to FIG. 3, showing cargo being carried by the first loading means;

FIG. 8 is similar to FIG. 5, showing a movable conveyor element raised up for the purpose of positioning a hatch cover therebeneath to the deck on which the hatch cover is located;

DETAILED DESCRIPTION OF THE PREFERRED EMBODIMENT OF THE PRESENT INVENTION

Figure 3:
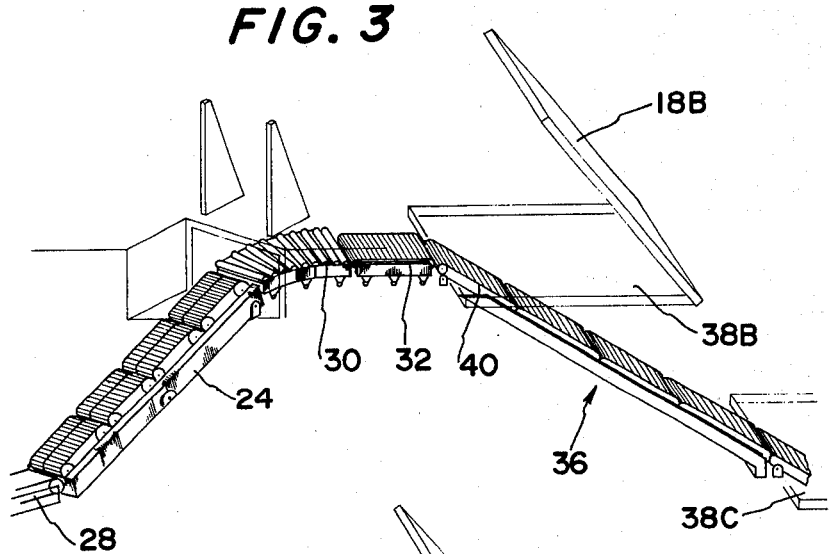
FIG. 3 is a perspective view of first loading means used in the apparatus of FIGS. 1 and 2.
Figure 5:
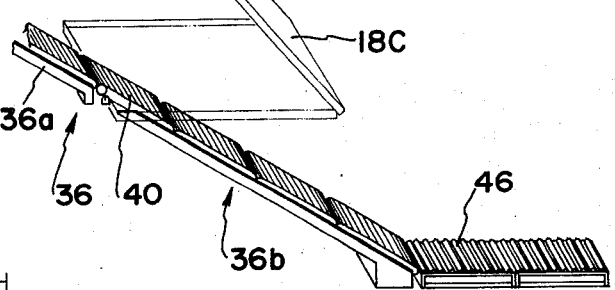
FIG. 5 is a perspective view of a portion of a lowering conveyor and a leading conveyor.
Figure 4:
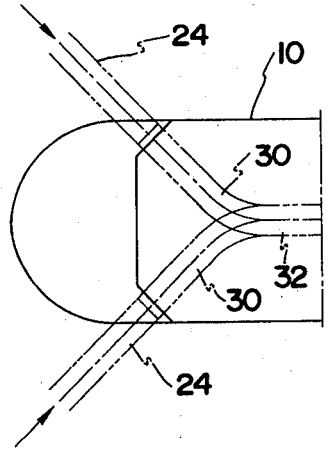
FIG. 4 is a schematic plan view of turning conveyors of the first loading means.

Referring now to FIGS. 1 and 2, there is shown a cargo vessel 10 having a cargo loading apparatus indicated generally by numeral 100. The cargo vessel 10 may have a plurality of holds and in the illustrated embodiment has a three-deck hold 14A, 14B and 14C the ports of which are defined by decks 16A, 16B, 16C and 16D respectively. The decks 16B and 16C have respective hatch covers 18B and 18C therein capable of being opened for the purpose of transferring cargoes through the decks (FIGS. 3 and 5). A ballast (not shown) may be placed in the space between the lowermost deck 16D and the bottom of the vessel.

Figure 10:
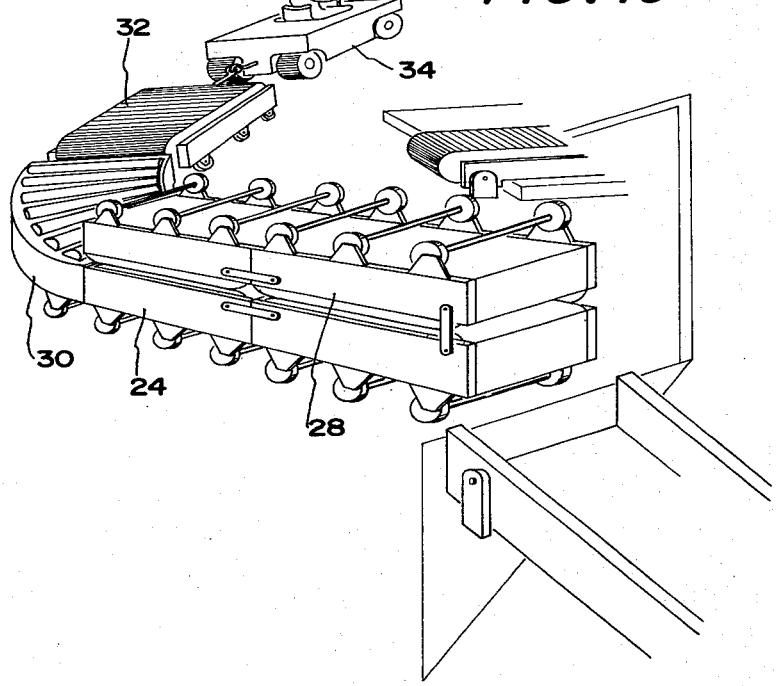
FIG. 10 is a perspective view of cargo carrying-in conveyor together with other conveyors being moved away from the loading position.

The cargo loading apparatus 100 may have the same units provided on both sides of the vessel so that the cargoes can be carried into the vessel even though it is along side the quay on only one of the sides thereof. One of the cargo loading units 20 is generally shown in FIG. 2 and comprises first loading means 22 to carry the cargo into the vessel 10 at one of the longitudinal ends thereof. The first loading means 22 has a cargo carrying-in conveyor 24 to carry the items 12 of cargo into the uppermost hold 14A. The cargo carrying-in conveyor 24 can be in the form of a chain conveyor and during cargo loading is positioned in an inclined manner as shown in FIGS. 1, 2, 3 and 7, with the upper end communicating with an inlet to the uppermost hold 14A and with the lower end engaging the quay 102. As shown in FIG. 1, the carrying-in conveyor 24 can be suspended by wires 26 which may in turn be pulled by a winch (not shown). The first loading means 22 can include an outside horizontal conveyor 28, one end of which is pivotally connected to the lower end of the cargo carrying-in conveyor 24 and the other end of which is adapted to have the cargo placed thereon. A turning conveyor 30 is provided which serves to turn the carried-in cargo units so as to direct them parallel to the plane of the deck 16B. As shown in FIGS. 3 and 7, the turning conveyor 30 can be in the form of chain-roller conveyor and connected at one end with the upper end of the carrying-in conveyor 24 by any suitable means (not shown). A leading conveyor 32 in the form of a belt conveyor as shown in FIGS. 3 and 7 is connected at one end with the other end of the turning conveyor 30 so as to lead the turned cargo units to the hatch cover 18B as shown in FIG. 3. Since the conveyors 24, 28, 30 and 32 are connected to each other, after loading the cargo they are moved away from the quay by a tractor 34 as shown in FIG. 10 with the horizontal conveyor 28 folded over on the carrying-in conveyor 24. It will be noted that the conveyors can be moved outside of the vessel 10 or that they may be alternatively kept in the vessel.

The first loading means is also provided with a lowering conveyor 36 which can be in the form of belt conveyor as shown in FIGS. 3, 5, 7 and 8. The lowering conveyor 36 extends linearly in an inclined manner through the openings 38B and 38C which are provided by opening the hatch covers 18B and 18C and at the lower end engages the lowermost deck 16D in the hold 14C, as shown in FIG. 2. As shown in FIG. 6, it can comprise a plurality of conveyor units 36a and 36b connected to each other by any suitable means. It should be noted that the respective conveyor units each include a plurality of stationary belts and a pivotally movable belt 40 at the position corresponding to the hatch covers and which is capable of being raised up about a pivotal point as shown in FIG. 8. Thus, the lowering conveyor 36 may extend in an inclined manner through the decks 16B and 16C to the deck 16D to allow the carried-in cargo to be transferred to the lowermost hold 14C. After the lowermost hold is filled with the cargo as shown in FIG. 8, then the pivotally movable belt 40 is pivotally raised up and thereafter the hatch cover 18C is closed and the movable belt 40 is pivoted back onto the hatch cover in a horizontal position. Thus, the lowering conveyor 36 can transfer the cargo to the middle hold 14B until it is filled with the cargo. Of course, a leading conveyor not shown may be provided in the hold 14B to receive the cargo units from the movable belt 40 of the lowering conveyor 36 and transfer them to a predetermined area in the hold 14B. After it is filled with the cargo, then another movable belt 40 which is positioned at the hatch cover 18B may be pivotally raised up and after closing the hatch cover 18B the belt is back down onto it to transfer the cargo to a predetermined area in the uppermost hold 14A.

As shown in FIG. 6, the conveyors 24, 30, 32 and 36 may be driven by respective hydraulic motors 124, 130, 132 and 136 which may be in turn supplied with pressurized oil from a reversible discharge pump 42 through a conduit 44. As also shown in this figure, one of the belts of the conveyor 24 is driven by the motor 124 and the other belts are driven through a chain-sprocket assembly 48 interconnecting the adjacent belts with one another. Similarly, one of the belts of the conveyor units 36a and 36b may be driven by the motor 136 and the other belts may be driven through a chain-sprocket assembly.

A leading conveyor 46 may be provided in the lowermost hold 14C so that it receives the cargoes 12 from the lowering conveyor 36 to direct them to a predetermined area in the hold.

The cargo loading unit 20 is also provided with second loading means 122 to carry cargo into the vessel 10 at the other longitudinal end thereof. The second loading means 122 also comprises a carrying-in conveyor 24', an outside horizontal conveyor 28', a turning conveyor 30'and a leading conveyor 32' which may be substantially identical to the conveyors 24, 28, 30 and 32. It will be noted from FIG. 2 that the second loading means 122 serves only to carry the cargo 12 on the quay into the uppermost hold 14A in the vessel 10.

Figure 9:
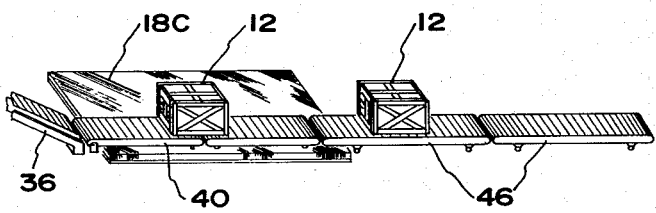
FIG. 9 is a perspective view of a leading conveyor of the first loading means.

Briefly, the first and second loading means 22 and 122 are positioned as shown in FIG. 2 and the cargo units 12 can be subsequently carried into the vessel 10 so that the lowermost hold 14C and the uppermost hold 14A are loaded with them and then so that the middle hold 14B is loaded with them. After the lowermost hold 14C is filled, then the movable belt 40 of the lowering conveyor 36 is horizontally positioned so that the middle hold 14B is loaded with the cargo units 12. FIG. 9 shows how the cargo units are transferred into the middle hold 14B. It will be understood from FIG. 9 that the cargo units 12 such as elongated steel elements, for example, can be easily carried into the vessel 10. Of course, it will be noted that the first and second loading means may carry the cargoes simultaneously.

While a preferred embodiment of the present invention has been described with reference to the accompanying drawing, it will be understood by those skilled in the art that it is by way of example and that various changes and modifications may be made without departing from the spirit and scope of the present invention, which is intended to be defined only by the appended claims.

What is claimed is:

1. A cargo loading apparatus for a cargo vessel having multi-story holds, comprising a loading means disposed adjacent one of the longitudinal ends of said vessel and including a carrying-in conveyor disposed in an inclined position between a quay and the uppermost hold for carrying cargo units from said quay into said uppermost hold, a turning conveyor connected to the upper end of said carrying-in conveyor for turning said cargo units to direct them parallel to the deck of said uppermost hold, and a lowering conveyor linearly extending through all the holds below the uppermost hold of said vessel and through holes in the respective decks between said holds in an inclined position for carrying the cargo units into said lower holds, said lowering conveyor having a plurality of stationary inclined conveyor elements having spaces between them at the positions of the decks of the holds, and movable conveyor elements in the spaces between said stationary conveyor elements and pivotally connected to the stationary elements on the upper sides of the spaces between the stationary elements, said movable elements being pivotable between a first position in which they are inclined so as to extend through the openings in the respective decks and between spaced stationary conveyor elements, whereby cargo units are transferred to the lower one of the adjacent holds above and below the respective decks, and a second position in which said movable elements are horizontally positioned so as to rest on closed hatch covers for the openings in the respective decks, whereby the cargo units are transferred to the holds above the respective decks.

2. A cargo loading apparatus as claimed in claim 1 further comprising a second loading means disposed adjacent the other longitudinal end of said vessel and including a carrying-in conveyor disposed in an inclined position between said quay and said uppermost hold for carrying cargo units from said quay into said uppermost hold, and a turning conveyor connected to the upper end of said carrying-in conveyor for turning said cargo units in a direction parallel to the axis of said vessel in said uppermost hold.

3. A cargo loading apparatus as claimed in claim 2 in which said second loading means further comprises an outside horizontal conveyor pivotally connected to the outside end of said carrying in conveyor for feeding cargo units to said carrying-in conveyor.

4. A cargo loading apparatus as claimed in claim 1 in which said loading means further comprises an outside horizontal conveyor pivotally connected to the outside end of said carrying-in conveyor for feeding cargo units to said carrying-in conveyor.

* * * * *